United States Patent
Ghosh et al.

(10) Patent No.: US 7,041,268 B2
(45) Date of Patent: May 9, 2006

(54) PROCESS FOR RECOVERY OF SULPHATE OF POTASH

(75) Inventors: Pushpito Kumar Ghosh, Bhavnagar (IN); Kaushik Jethalal Langalia, Bhavnagar (IN); Maheshkumar Ramniklal Gandhi, Bhavnagar (IN); Rohit Harshadray Dave, Bhavnagar (IN); Himanshu Labhshanker Joshi, Bhavnagar (IN); Rajinder Nath Vohra, Bhavnagar (IN); Vadakke Puthoor Mohandas, Bhavnagar (IN); Sohan Lal Daga, Bhavnagar (IN); Koushik Halder, Bhavnagar (IN); Hasina Hajibhai Deraiya, Bhavnagar (IN); Ramjibhai Devjibhai Rathod, Bhavnagar (IN); Abdulhamid Usmanbhai Hamidani, Bhavnagar (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/814,778

(22) Filed: Mar. 30, 2004

(65) Prior Publication Data
US 2005/0220698 A1 Oct. 6, 2005

(51) Int. Cl.
*C01D 5/00* (2006.01)
*C01D 3/06* (2006.01)

(52) U.S. Cl. .............. 423/552; 423/184; 423/197; 423/199; 423/499.1; 423/499.4

(58) Field of Classification Search ........ 423/551–553, 423/184, 199, 499.1, 499.4, 197; 23/297, 23/298
See application file for complete search history.

(56) References Cited

U.S. PATENT DOCUMENTS

| 229,249 | A | * | 6/1880 | Hake .................... 423/193 |
| 2,437,182 | A | * | 3/1948 | Barr et al. ............... 423/196 |
| 2,862,788 | A | * | 12/1958 | Stanley, Jr. et al. ........ 423/196 |
| 2,895,794 | A | * | 7/1959 | Dancy et al. .............. 423/196 |
| 3,003,849 | A | * | 10/1961 | Veronica .................. 423/199 |
| 3,004,826 | A | * | 10/1961 | Marullo et al. ............ 423/196 |
| 3,058,806 | A | * | 10/1962 | Ebner ..................... 423/197 |
| 3,082,063 | A | * | 3/1963 | Cevidalli et al. .......... 423/199 |
| 3,110,561 | A | * | 11/1963 | Henne et al. .............. 423/199 |
| 3,198,601 | A | * | 8/1965 | Veronica et al. ........... 423/199 |
| 3,207,576 | A | * | 9/1965 | Marullo et al. ............ 423/199 |
| 3,243,259 | A | * | 3/1966 | Stein et al. ............... 423/197 |
| 3,342,548 | A | * | 9/1967 | Macey .................... 423/199 |
| 3,348,913 | A | * | 10/1967 | Veronica .................. 423/199 |
| 3,484,195 | A | * | 12/1969 | Lewis et al. .............. 423/163 |
| 3,528,767 | A | * | 9/1970 | Garrett ................... 423/199 |
| 3,589,871 | A | * | 6/1971 | Neitzel ..................... 23/298 |
| 3,592,615 | A | * | 7/1971 | Neitzel ..................... 23/297 |
| 3,615,174 | A | * | 10/1971 | Lewis ..................... 423/112 |
| 3,634,041 | A | | 1/1972 | Ryan et al. |
| 3,967,930 | A | * | 7/1976 | Sadan ....................... 23/296 |
| 4,129,642 | A | * | 12/1978 | Neitzel ................... 423/199 |
| 4,306,880 | A | * | 12/1981 | Garrett ................... 23/295 S |
| 4,533,536 | A | * | 8/1985 | Bichara et al. ............ 423/551 |
| 6,315,976 | B1 | * | 11/2001 | Phinney .................. 423/551 |
| 6,334,990 | B1 | * | 1/2002 | Phinney .................. 423/551 |
| 6,776,972 | B1 | * | 8/2004 | Vohra et al. .............. 423/166 |
| 2003/0080066 | A1 | * | 5/2003 | Vohra et al. .............. 210/714 |

FOREIGN PATENT DOCUMENTS

CN 1 084 492 A 3/1994
CN 1 188 076 A 7/1998

OTHER PUBLICATIONS

DERWENT Abstract accession No. 1995-194561, for CN 1084492 A, published Mar. 1994.*
DERWENT Abstract accession No. 2002-692254, for CN 1188076 A, published Jul. 1998.*
DERWENT Abstract accession No. 2001-282765, for CN 1281822 A (corresponding to application 2000-0112497 discussed in the instant specification), published Jan. 2001.*
Niu, Z. et al., "Manufacture of potassium sulfate and other inorganic materials from bittern brine", Database CA vol. 24, No. 4, pp. 18-20, Abstract XP002294205.
D.J. Mehta, "Production of Potassium Sulphate from Mixed Salt obtained from Salt Works of Little Rann of Kutch", Salt Research and Industry, vol. 2, No. 4, 1965, pp. 139-140.

(Continued)

*Primary Examiner*—Stanley S. Silverman
*Assistant Examiner*—Ardith E. Hertzog
(74) *Attorney, Agent, or Firm*—Darby & Darby

(57) ABSTRACT

The present invention is directed to a novel integrated process for the recovery of sulphate of potash (SOP) from sulphate rich bittern. The process requires bittern and lime as raw materials. Kainite type mixed salt is obtained by fractional crystallization of the bittern, and is converted to schoenite which is subsequently reacted with muriate of potash (MOP) for its conversion to SOP. End liquor from kainite to schoenite conversion (SEL) is desulphated and supplemented with $MgCl_2$ using end bittern generated in the process of making carnallite. Decomposed carnallite liquor produced is reacted with hydrated lime for preparing $CaCl_2$ solution and high purity Mg(OH)2 having low boron content. It is shown that the liquid streams containing potash are recycled in the process, and the recovery of potash in the form of SOP is quantitative.

28 Claims, No Drawings

OTHER PUBLICATIONS

Fernandez-Lozano, J. A., et al., "Production of Potassium Sulphate by an Ammoniation Process", The Chemical Engineer, Oct. 1979, pp. 688-690.

Scherzberg, H., et al., "Messo pilots new potassium sulphate process", Phosphorus & Potassium, Mar.-Apr. 1992, No. 178, pp. 20-26.

Bhat, G. D., et al., "Mixed Salt from Sea Bittern", Salt Research & Industry, Oct. 1965, vol. 2, No. 4, pp. 126-128.

Patel, K. P., et al., "Potassium Sulphate from Syngenite", Salt Research & Industry, pp. 42.

Seshadri, K., et al., "Manufacture of Potassium Chloride and Byproducts from Sea Bittern", Salt Research & Industry, Apr.-Jul. 1970, vol. 7, Nos. 2 & 3, pp. 39-44.

Freeman, Michael, "Great Salt Lake—A fertile harvest for IMC", Phosphorus & Potassium, Jan.-Feb. 2000, No. 225, pp. 32-35.

Wiley—VCH—Ullmann's Encyclopedia of Industrial Chemistry, "4.2.2. Production from Seawater [62], [63]", Sixth Edition, 2002.

Abstract for Canadian Patent No., Process for the Manufacture of Potassium Sulphate by Treatment of Solutions Mar. 9, 1983, CA 1203666.

Balarew, Chr., et al., "Improved Treatment of Waste Brines", pp. 551-554.

Hildebrand, John H., et al., The Extraction of Potash and Other Constituents from Sea Watter Bittern, The Journal of Industrial and Engineering Chemistry, Feb. 1918, vol. 10, No. 2, pp. 96-105.

Gurbuz, H., et al., "Recovery of Potassium Salts from Bittern by Potassium Pentaborate Crystallization", Separation Science and Technology, 1996, vol. 31, No. 6, pp. 857-870.

Mehta, A. S., "Henry's Constant for Bromine-Sea Brine Systems and Liquid Film Mass Transfer Coefficient for Desorption of Bromine from Sea Brine", Indian Chem. Engr., Apr.-Jun. 2003, Section A, vol. 45, No. 2, pp. 75-83.

Abstract for Chinese Patent Application, Publication No. 1084492, "Process for preparation of potassium sulfate from bittern and potassium chloride", Mar. 30, 1994.

Abstract for Chinese Patent Application, Publication No. 1281822, "Method for preparing potassium sulfate by using sulfate type potassium-containing bittern", Jan. 31, 2001.

* cited by examiner

PROCESS FOR RECOVERY OF SULPHATE OF POTASH

FIELD OF THE INVENTION

The present invention provides an integrated process for the recovery of sulphate of potash (SOP) from sulphate-rich bittern. The process requires only bittern and lime as raw materials and affords, besides SOP, low boron containing $Mg(OH)_2$, gypsum and salt, as co-products, all of which are obtained in pure form.

BACKGROUND OF THE INVENTION

SOP is a dual fertilizer containing 50% $K_2O$ and 18% S. It has the lowest salt index and is virtually free of chloride, which makes it a superior fertilizer to muriate of potash (MOP). On the other hand, MOP is easy to produce, especially, when brine/bittern is low in sulphate content such as in the Dead Sea and this accounts for its lower price compared to SOP. Countries such as India, which do not have low sulphate bittern, but which have adequate bittern of sea and sub-soil origin, would be greatly benefited if SOP can be produced economically from such bittern sources. Besides its application as a fertilizer, potassium sulphate has numerous industrial applications as well.

$Mg(OH)_2$ is commercially used in pulp and paper industries and also as antacid and fire retardant. Waste water and acidic effluent treatment represent additional high growth areas for its application. $Mg(OH)_2$ is also used for production of magnesia (MgO), magnesium carbonate and other magnesium chemicals. $Mg(OH)_2$ that is low in $B_2O_3$ impurity is especially suitable for production of refractory grade MgO. High quality gypsum ($CaSO_4.2H_2O$) finds applications in the white cement industry and for manufacture of high strength α and β Plaster of Paris. Sodium chloride that contains small quantities of potassium chloride finds application in the edible salt industry.

Reference is made to the well-known Mannheim process involving reaction of MOP with sulphuric acid. The major problem with the process is that it is energy intensive and poses a problem of HCl management when no application of commensurate volume for HCl is available in the vicinity. J. A. Fernandez Lozano and A. Wint, ("Production of potassium sulphate by an ammoniation process", *Chemical Engineer*, 349, pp 688–690, October 1979) disclose a process of SOP manufacture from MOP through reaction with gypsum in presence of ammonia. The principle of the process is double decomposition reaction between gypsum and potassium chloride in presence of ammonia at 0° C. The main disadvantage of the process is that it is energy intensive and necessitates careful design of the reactor for safe operation.

H. Scherzberg et al. ('Messo pilots new potassium sulphate process', *Phosphorous & Potassium*, 178, March–April 1992, p-20) describe the successful trials on a process involving reaction of MOP with sodium sulphate to produce the double salt glaserite ($3K_2SO_4.Na_2SO_4$). The glaserite is in turn reacted with MOP to produce SOP. The main disadvantage of the process is that it would be unsuitable for those who do not have access to such raw materials. Moreover, the process involves several complex unit operations including the need for chilling. Such processes have their limitation on large scale.

H. Scherzberg and R. Schmitz ('Duisberg's alternative to Mannheim', *Phosphorous & Potassium*, 178, March–April 1992, p-20), describe an integrated process for production of SOP from KCl and $MgSO_4$ or $Na_2SO_4$. The main drawback of the process is that the amount of NaCl in raw materials has a critical effect on the process and, as such, is less applicable to crude mixed salt as obtained from sea bittern. Another disadvantage is that the process involves heating and cooling which makes it energy intensive. Yet another disadvantage is that the by-product obtained is $MgCl_2$ in concentrated solution form which has a limited market and lower appeal compared to low $B_2O_3$ containing $Mg(OH)_2$ solid produced as part of the integrated process of the present invention.

G. D. Bhatt et al. ('Mixed Salt from Sea Bittern', *Salt Research & Industry*, 2, 126–128, 1969) describe a process for the manufacture of mixed salt, i.e., comprising of a mixture of NaCl and kainite ($KCl.MgSO_43H_2O$), from sea bittern through solar evaporation and fractional crystallisation.

Patel et al. (*Salt Research & Industry*, Vol. 6, No. 14, 1969) disclose a process for the preparation of syngenite from mixed salt in pure form. K. P. Patel, R. P. Vyas and K. Seshadri ('Potassium Sulphate from Syngenite', *Salt Research & Industry*, Vol. 6, No. 2, April 1969) disclose a process for preparation of SOP by leaching syngenite ($K_2SO_4.CaSO_4.H_2O$) with hot water and then recovering it by solar evaporation. The main drawback of the process is that it is energy intensive. Moreover, production of syngenite from nixed salt is itself an involved affair.

K. Sehsadri et al ("*Manufacture of Potassium chloride and byproducts from Sea Bittern*" *Salt Research and Industry*, April–July 1970, Vol. 7, page 39–44) disclose a process wherein mixed salt (NaCl and kainite) obtained from bittern is dispersed with high density bittern in proper proportion and heated to a temperature of 110° C. when kieserite ($MgSO_4.H_2O$) is formed which is separated by filtering the slurry under hot conditions. The filtrate is cooled to ambient temperature, when carnallite crystallizes out. Carnallite is decomposed with water to get a solid mixture of sodium chloride and potassium chloride while magnesium chloride goes into solution. Solid mixture of potassium chloride and sodium chloride is purified using known techniques to produce pure potassium chloride. The drawbacks of this process are that it fails to make use of the sulphate content in bittern and, instead, offers an elaborate process for manufacture of MOP, which, in any case, is inferior to SOP as fertilizer.

U.S. Patent Application Number 2003/0080066 dated Oct. 29, 2001 by Vohra, Rajinder N. et. al. discloses an integrated process for recovery of high purity salt, potassium chloride, and end bittern containing 7.5 gpl Br. The process is based on desulphatation of brine with distiller waste of soda ash industry or calcium chloride generated from limestone and acid. The main drawback of the patent application is that the process is less attractive when distiller waste is not available in the vicinity and the process becomes less economical when carnallite has to be obtained from bittern without production of industrial grade salt. Moreover, as in the case referred to above, it is desirable to utilize the sulphate content in bittern and produce SOP in preference to MOP.

Michael Freeman ('Great Salt Lake-A fertile harvest for IMC' in *Phosphorus & Potassium*, 225, January–February, 2000) describe a process comprising concentrating the brine containing 0.2–0.4% KCl, harvesting mixed salt, separation of high sodium chloride fraction through floatation, leaching with sulphate rich brine to produce schoenite, hot water dissolution of schoenite, fractional crystallization of SOP and recycling of mother liquor containing up to 30% of original K to evaporation pond. The main drawbacks of the process are: (i) need for floatation which involves use of organic chemicals whose disposal is problematic, (ii) need for external heat for recovery of SOP from schoenite through fractional crystallization at elevated temperature, (iii) need for recycling of as much as 30% of K to evaporation ponds where it again gets contaminated with other components of the brine.

In Ullmann's Encyclopedia of Industrial Chemistry, Sixth Edition, 1999, under the Chapter, Potassium compounds, a description of a process for production of SOP in Sicily is given, Kainite ($KCl.MgSO_4.2.75H_2O$), is obtained from a potash ore by flotation. It is then converted into schoenite at ca. 25° C. by stirring with mother liquor containing the sulfates of potassium and magnesium from the later stages of the process. Schoenite is filtered off and decomposed with water at ca. 48° C. This causes magnesium sulfate and part of the potassium sulfate to dissolve and most of the potassium sulfate to crystallize. The crystals are filtered and dried. The sulfate mother liquor is recycled to the kainite—schoenite conversion stage. The main drawbacks of the process are that there is no mention of the fate of the mother liquor obtained upon conversion of kainite into schoenite which would inevitably entail considerable loss of K, and the need for external source of heat to effect the fractional crystallization of SOP.

Chinese Patent No. 1281822 corresponding to application No. CN 2000-112497, 29 Aug. 2000, by Song, Wenyi; Liu, Yu; Zhao, Shixiang; Dai, Fangfa, titled method for preparing $K_2SO_4$ from sulphate type K-containing bittern. The method comprises concentrating the bittern, separating NaCl, concentrating to obtain crude K—Mg salt containing 10–45% NaCl, crushing, mixing with saturated bittern to obtain a solution with concentration of 20–40%, removing NaCl by back-floatation, concentrating, dewatering to obtain refined K—Mg salt containing less than 5% NaCl, mixing the K—Mg salt and water at specified ratio, allowing the mixture to react at 10–60° P for 0.5–3 hr, separating to obtain schoenite, mixing with KCl and water at specified ratio, allowing the mixture to react at 10–70° F. for 0.25–3 hr and separating to obtain $K_2SO_4$. The drawbacks of the process are (i) need for elaborate method of purification of mixed salt that includes removing NaCl by the less desirable method of back floatation that involves use of organic chemicals, (ii) lack of any mention of the manner in which the various effluent streams are dealt with, and (iii) dependence on outsourced KCl since no mention is made of any process for KCl production as part of the process.

J. H. Hildebrand ('Extraction of Potash and other Constituents from sea water Bittern' in Journal of Industrial and Engineering Chemistry, Vol. 10, No. 2, 1918, pp 96–106) describe theoretical aspects of the recovery of potash from sea bittern and propose a process for extraction. According to this process, bittern is evaporated at a temperature between 100–120° C., thereby forming a solid mixture of sodium chloride and kieserite ($MgSO_4.H_2O$), separating this mixture under hot conditions in a heated centrifuge, and cooling the mother liquor in a cooler for separation of carnallite. Carnallite is decomposed and washed with water to produce potassium chloride. The drawback of his process is that it is demanding in terms of energy requirement and sufficiently pure carnallite cannot be obtained. The main drawback of the process is the contamination of kieserite with NaCl, which would necessitate further purification to obtain products in saleable form. Another drawback of the process is that it requires energy to remove sulphate from bittern in the form of kieserite whereas it would be preferable to utilize the sulphate for the production of SOP.

D. J. Mehta et al ('Production of Potassium Sulphate from Mixed Salt obtained from Salt Works of Little Rann Of Kutch' *Salt Research & Industry*, Vol. 2 No. 4, October 1965) describe a process using floatation technique for the production of potassium sulphate from two types of mixed salt available from the salt works of the Little Rann of Kutch. The process suffers from the drawback of lack of suitability when high sulphate containing sea bittern is used and the need for froth floatation, which is costly, cumbersome and polluting.

Reference is made to the Chapter in Ullmamn's Encyclopedia of Industrial Chemistry, Sixth Edition, 2002, (Electronic Version) dealing with Magnesium Compounds written by Margarete Seeger, Walter Otto, Wilhelm Flich, Friedrich Bickelhaupt and Otto. S. Akkerman, wherein the process of preparation of magnesium hydroxide from seawater is described. It is mentioned therein that preparation of low boron containing magnesia requires over liming of the seawater up to pH 12 to maintain $B_2O_3$ content less than 0.05% in magnesia Over liming involves higher lime cost, need for neutralization of supernatant and results in a colloidal suspension which is not easy to filter. Another drawback is a lack of application of calcium chloride-containing effluent which is discharged back into be sea.

Patent Application No. 423211, CA 1203666, by Wendling et al titled, "Process for the manufacture of potassium sulphate by treatment of solution containing magnesium chloride and potassium chloride" describes a process for the production of potassium sulphate from solutions containing magnesium chloride, such as solutions of carnallite ore and, in particular, the equilibrium mother liquors of a unit for the treatment of carnallite. According to this process, sodium sulphate and potassium chloride are added to the solutions containing magnesium chloride, so as to precipitate sodium chloride and schoenite, $K_2SO_4MgSO_46H_2O$, and the schoenite obtained is treated in a known manner to produce potassium sulphate. The main drawback of the process is the need to outsource sodium sulphate and the lack of any mention of a solution to the problem of KCl loss in effluent streams.

H. Gurbuz et al. ('Recovery of Potassium Salts from Bittern by Potassium Pentaborate Crystallisation' in *Separation Science & Technology*, 31(6), 1996, pp. 857–870) disclose the preparation of sodium pentabotate from the reaction of Tincal and recycled $H_3BO_3$ in presence of water and thereafter treated with bittern to selectively precipitate out potassium pentaborate, which in turn is acidulated with sulphuric acid and fractionally crystallized to remove $K_2SO_4$ and recycle the $H_3BO_3$ in the process, The main drawbacks of the process are that the mother liquor contains significant quantities of boron, which entails elaborate procedure to recover boron and, moreover, the MgO obtained from such mother liquor would be unfit for industrial use. Moreover, although such a process can still be thought of for sulphate poor bittern, it would not be a preferred route when the bittern is rich in sulphate content. Yet another drawback is the need to chill the acidulated product for high yield.

A. S. Mehta (*Indian Chemical Engineer*, 45(2), 2003, p. 73) describes a process of bromine manufacture from bittern. Bittern is acidified with sulphuric acid to a pH of 3.0–3.5 and the bromide ion is then oxidized with chlorine and stripped off with the help of steam. The acidic de-brominated bittern is neutralized with lime, the sludge thus formed removed, and the effluent discharged. Bromine plants located in the vicinity of natural salt beds in the Greater Rann of Kutch in Gujarat, India utilize natural bittern for bromine production by the above method and discharge their effluent back into the Rann. Disposal of sludge poses a formidable challenge in these plants.

Chr. Balarew, D. Rabadjieva and S. Tepavitcharova ("*Improved Treatment of Waste Brines*" International Symposium on Salt 2000, page 531–554) describe recovery of marine chemicals. The authors describe the use of lime for precipitation of $Mg(OH)_2$ from a part of available bittern, and desulphatation of balance bittern with the resultant $CaCl_2$ solution for recovery of KCl via carnallite. The authors have not discussed any scheme of utilizing such methodology for production of SOP from sulphate-rich bittern. Moreover, as will be evident later, $Mg(OH)_2$ produced directly from raw bittern has much higher $B_2O_3$ content compared to $Mg(OH)_2$ prepared from the $Mg^{2+}$ source of the present invention, which is linked to production of SOP.

Chinese Patent No. 1084492, Lu Zheng, describes a process of manufacture of SOP from bittern and potassium chloride. In this process, bittern is processed by evaporation, cooling, floatation, and is then reacted with potassium chloride to make potassium sulfate and by-products of industrial salt and residual brine. The main drawbacks of this process are that it requires involved separation techniques like floatation to remove NaCl from mixed salt and KCl required for production of SOP from schoenite has to be procured separately. Moreover, although overall yield in terms of potash recovery is 95%, yield with respect to such procured KCl is not mentioned.

OBJECTS OF THE INVENTION

It is an important object of the present invention to produce superior fertilizer, SOP, from sulphate-rich bittern sources such as sea bittern and natural bittern (includeing subsoil bittern and bittern with high potassium content), which contains affective amounts of K, Mg and $SO_4$ suitable for kainite production, in a cost effective manner through integration with production of valuable co-products.

Another object is to dispense with the need for floatation to remove NaCl from mixed salt and instead to leach away NaCl in the mother liquor (SEL) and simultaneously convert kainite into schoenite.

Another object is to produce SOP from schoenite under ambient conditions through the known method of reaction with KCl in presence of water and wherein the MOP is generated from SEL eliminating the need to source it externally, Another object is to maximize recovery of potash in the form of SOP from mixed salt.

Another object is to desulphate the SEL cost-effectively to promote carnallite formation.

Another object is to evaporate desulphated SEL in a multiple effect evaporator to recover water for reuse.

Another object is to utilize the NaCl separated as edible salt.

Another object is to utilize the $MgCl_2$-rich carnallite decomposed liquor (CDL) for cost-effective production of $CaCl_2$ and $Mg(OH)_2$ through treatment with lime.

Another object is to utilize the washings from $Mg(OH)_2$ filtration for preparation of slaked lime from quick lime which conserves water and recycles residual $CaCl_2$ in the washings.

Another object is to utilize the $CaCl_2$ solution above for desulphatation of SEL.

Another object is to recover KCl that is lost in CDL by recycling the latter in the manner described above.

Another object is to show that MgO produced from the above $Mg(OH)_2$ contains very low (<0.03%) levels of $B_2O_3$ impurity.

Another object is to minimize effluent generation in the process and instead to utilize effluent to enhance potash recovery or to convert into value-added products.

Another object is to replace conventionally employed slaked lime with $Mg(OH)_2$ generated in the process of the invention for neutralization of acidic debrominated bittern to eliminate sludge formation when acids such as sulphuric acid are employed for acidulation of bittern and instead make such bittern immediately useful for mixed salt production. The bittern used in the invention reciuires the least evaporation to produce kainite mixed salt, and waste bittern sources including debrominated bittern effluent.

SUMMARY OF THE INVENTION

The present invention provides an integrated process for the preparation of sulphate of potash from bitterns, comprising, (i) subjecting bittern to fractional crystallization to obtain kainite type mixed salt with high kainite content and $MgCl_2$-rich end bittern, and subjecting the MgCl2 rich end bittern to desulphation;

(ii) treating the kainite type mixed salt with water and mother liquor obtained in step (xiii) below to leach out substantially all NaCl from the mixed salt and simultaneously convert kainite into schoenite;

(iii) filtering the schoenite and separating the filtrate, (iv) desulphating the filtrate with aqueous $CaCl_2$;

(v) filtering the gypsum produced in step (iv) and mixing the filtrate with the $MgCl_2$-rich filtrate obtained in step (vii) below, (vi) evaporating the resultant solution of step (v) and cooling to ambient temperature to crystallize crude carnallite, (vii) centrifuging the crude carnallite and recycling the required quantity of filtrate to step (v), (viii) decomposing the crude carnallite with appropriate quantity of water from step (vi) to yield crude KCl and carnallite decomposed liquor;

(ix) filtering the crude KCl, and washing with water to remove adhering $MgCl_2$ and subjecting to hot leaching for production of MOP and NaCl, (x) mixing the carnallite decomposed liquor from step (viii) and washing from step (ix) and treating with hydrated lime, (xi) filtering the slurry and washing the cake to produce $Mg(OH)_2$ and $CaCl_2$-containing filtrate for the desulphatation process of step (iv).

(xii) treating by known method the schoenite produced in step (iii) with MOP produced in step (ix) to produce SOP under ambient condition, (xiii) filtering the SOP and collecting separately the mother liquor hereinafter referred to as KEL, (xiv) recycling the KEL of step (xiii) in the process of step (ii).

It may be noted that certain steps of the above process are triggered initially with $CaCl_2$ and water procured externally and thereafter these are largely generated in the process of the invention as described above. In one embodiment of the invention, the mixed salt contains KCl—15–22%, NaCl—15–22%, $MgSO_4$—28–40%, $MgCl_2$—5–10%.

In an embodiment of the present invention, bitters of density in the range of 29–34° Be (sp. gr. 1.25–1.31) is used for production of mixed salt as described in the prior art and then converted into schoenite with simultaneous leaching of NaCl from the solid mass.

In another embodiment of the present invention, mixed salt is treated with a 0.3–0.5:1 ratio of water and KEL rich in KCl and $MgSO_4$ and low in NaCl and $MgCl_2$ to minimize loss of K from mixed salt without hampering transformation of kainite into schoenite and leaching of NaCl from the mixed salt.

In another embodiment of the present invention, schoenite is reacted with MOP and water in the ratio of 1:0.3–0.6:1–2 to produce SOP and KEL and wherein the MOP is produced in situ from SEL.

In another embodiment of the present process, MOP is produced from carnallite which, in turn, is obtained through desulphatation of SEL, treatment with 400–440 g/L $MgCl_2$ liquor into the ratio of 1 part of desulphated bittern and 0.7–0.9 parts of $MgCl_2$ liquor, and forced evaporation till the solution attains a temperature of 120–128° C. at atmospheric pressure.

In another embodiment of the present process, the filtrate obtained after removal of NaCl is cooled to room temperature whereupon carnallite is obtained upon filtration while the filtrate contains 400–440 g/L of $MgCl_2$ and is recycled back into a fresh lot of desulphated SEL for further production of carnallite.

In another embodiment of the present process, the wet carnallite is treated with water in the ratio of 1:0.4–0.6 to obtain crude KCl.

In another embodiment of the present process, the magnesium chloride in carnallite decomposed liquor is supplemented with $MgCl_2$ in the end liquor and treated with line to produce $Mg(OH)_2$ and required quantity of calcium chloride solution (20–30% strength w/v) for desulphatation of SEL.

In another embodiment of the present process, the $Mg(OH)_2$ is calcined in the temperature range of 800–900° C. to produce MgO with <0.04% $B_2O_3$.

In another embodiment of the present process, fresh water requirement is kept to a minimum by recycling water from forced evaporation step along with washing generated in the purification of gypsum, $Mg(OH)_2$ and KCl.

In another embodiment of the present process, acidified de-brominated bittern, which is an ideal raw material for mixed production, is neutralized with crude $Mg(OH)_2$ instead of with lime to eliminate sludge formation.

DETAILED DESCRIPTION

The main inventive step is the recognition that the step of transforming kainite in mixed salt into schoenite and leaching of NaCl from mixed salt can be simultaneously performed in a single operation with minimum loss of KCl in mixed salt. Another inventive step is self reliance wherein the need for outsourced MOP is minimized by producing it instead from the waste filtrate of schoenite manufacture. Another inventive step is the desulphatation of SEL required for MOP production using calcium chloride generated in Situ from the $MgCl_2$ in desulphated SEL that shows up as $MgCl_2$-rich streams of carnallite decomposed liquor and end liquor. Another inventive step is the coupling of $Mg(OH)_2$ production with desulphatation of SEL and thereby eliminating the problem of $CaCl_2$ waste management otherwise encountered in production of $Mg(OH)_2$ from brine or bittern Another inventive step is the use of CDL primarily for $Mg(OH)_2$ production which greatly reduces $B_2O_3$ impurity in $Mg(OH)_2$ and, as a result, in MgO obtained there from. Another inventive step is the local use of crude $Mg(OH)_2$ for neutralization of acidified de-brominated bittern prior to production of mixed salt. Another inventive step is the recycling of liquid effluents to minimize requirement of fresh water while simultaneously enhancing recoveries and addressing the problem of effluent disposal.

The following examples are given by way of illustration and should not be construed to limit the scope of present invention.

EXAMPLE-1

In a typical process, 200 $M^3$ of 29.5° Be' (sp. gr. 1.255) sea bittern was subjected to solar evaporation in a lined pan. The first fraction (20 Tons) containing mainly crude salt was removed at 34° Be' (sp. gr. 1.306). The bittern was further evaporated to 35.5° Be' (sp. gr. 1.324) and sels Mixt. fraction (15 tons) was separated. The resultant bittern (100 $M^3$) was transferred to a second lined pan and solar evaporation was continued whereupon 16 tons of kainite type mixed salt and 26 $M^3$ of end bittern were obtained. The mixed salt was further processed for production of schoenite as described in subsequent examples while a part of the end bittern was desulphated with outsourced calcium chloride to generate desulphated end bittern. A part of the desulphated end bittern was subsequently treated with hydrated lime to produce calcium chloride and magnesium hydroxide. The calcium chloride solution was filtered and used for desulphatation of SEL of Example-6. The other part of the desulphated end bittern was used as $MgCl_2$ source in the same example to promote carnallite formation from desulphated SEL. Similar experiments were also conducted with other sources of bittern such as sub-soil bittern and bittern obtained after bromine recovery.

EXAMPLE-2

142.0 kg of kainite type mixed salt, having chemical composition: KCl—15.5%, NaCl—14.6%, $MgSO_4$—39.5% and, was treated with 140 L of water and stirred for 2.5 hr in a vessel. The slurry was filtered using basket centrifuge and yielded 32.0 kg of schoenite as solid product, analysing $K_2SO_4$—38.0%, $MgSO_4$—30.2%, and NaCl—1.2%, and 200 L of filtrate (SEL), analysing KCl—7.6, NaCl—16.1%, $MgSO_4$—21.1%, and $MgCl_2$—8.4%. The schoenite was treated with solution of 12.5 kg of MOP in 49.0 L of water under agitation for 3.5 hr. The slurry was filtered to obtain 16.0 kg SOP, analyzing $K_2SO_4$—95.0%, NaCl—1.0%, $MgSO_4$—1.0%, and 60 L of filtrate (KEL) analyzing KCl—15.0%, NaCl—1.5%, $MgSO_4$—9.7%, and $MgCl_2$—3.9%.

EXAMPLE-3

60.0 kg of the mixed salt having the same composition as in Example-2 was taken along with the KEL obtained in Example-2. 27 L of water was additionally added and the contents were stirred for 2.5 hr. The slurry was filtered in a centrifuge to obtain 26.0 kg of schoenite analysing $K_2SO_4$—39.7%, $MgSO_4$—29.5%, NaCl—0.7%, and $MgCl_2$—0.6%, and 95.0 L of filtrate (SEL), analysing as KCl—9.9%, NaCl—13.0%, $MgSO_4$—18.6%, and $MgCl_2$—6.0% d. The schoenite was reacted with solution of 10.4 kg of MOP in 38 L of water in a vessel under stirring for 3.5 hr. The resultant slurry was filtered using centrifuge to obtain 14.5 kg SOP analyzing $K_2SO_4$—98.1, NaCl—0.2%, $MgSO_4$—1.4%, and 45 L of filtrate (KEL) analysing as $K_2SO_4$—12.4%, KCl—6.15%, NaCl—0.9%, $MgSO_4$—1.0%, and $MgCl_2$—10.2%,

EXAMPLE-4

104 kg of mixed salt analyzing KCl—14.1%, NaCl—16.5%, MgSO4—41.6%, was reacted with 100 L of KEL analyzing as $K_2SO_4$—13.9%, NaCl—2.8%, and $MgCl_2$ 11.6%, and 40 L of water for 2 hr. The slurry was centrifuged to get 34.8 kg of schoenite analyzing $K_2SO_4$—37.0%, $MgSO_4$—30.3%, and NaCl—4.9%, and 190.0 L of filtrate (SEL) analyzing as KCl—9.5%, NaCl—13.0010%, $MgSO_4$—15.1%, $MgCl_2$—8.0%, and. The schoenite was further reacted with a solution of 12.5 kg MOP in 46.0 L of water for 3.5 hr to yield 17.5 kg SOP and 80 L of KEL. The SOP analyzed as $K_2SO_4$—97.3%, NaCl—0.2%, and $MgSO_4$—3.0% and KEL as KCl—16.7%, NaCl—1.3%, $MgSO_4$—11.0%, and $MgCl_2$—2.7%.

EXAMPLE-5

In this experiment 150.0 kg of mixed salt analyzing as KCl—13.1%, NaCl—19.8%, $MgSO_4$—38.0%, $MgCl_2$—1.9%, and was taken in a vessel along with 160 L of KEL, analyzing KCl—17.0%, NaCl—3.3%, $MgSO_4$—9.0%, $MgCl_2$—1.9%, and 60 L of water and stirred for 2 hr. The resultant slurry was centrifuged to get 49.9 kg of schoenite analyzing $K_2SO_4$—42.0%, $MgSO_4$—32.2%, NaCl—0.7%, and 255 L of filtrate (SEL) analyzing as KCl—10.5%, NaCl—12.3%, $MgSO_4$—13.7%, $MgCl_2$—6.70%. The schoenite was reacted with a solution of 19.0 kg of MOP in 75 L of water for 3.5 hr in a vessel with continuous stirring. The slurry was centrifuged to get 27.0 kg of SOP analyzed as $K_2SO_4$—94.3%, NaCl—0.2%, and $MgSO_4$—3.7%, and 85 L of filtrate (KEL), analyzing as KCl—15.5%, NaCl—0.8%, $MgSO_4$—10.5%, and $MgCl_2$—3.0%.

EXAMPLE-6

59 L of desulphated end bittern obtained in Example-1 having chemical composition: KCl—1.15%, NaCl—1.3%, $MgCl_2$—41.2%, $CaSO_4$-traces was diluted with 40 L of water and treated with 14.7 kg of freshly prepared hydrated lime (87.7% active strength) for 1 hr. The resultant slurry was filtered and the cake was washed with 30 L of water. 90 L of total filtrate containing $CaCl_2$—22.3% and $MgCl_2$—3.0% was obtained. The solid magnesium hydroxide was further washed with 100 L of water to make it free from soluble impurities. 15.7 kg of $Mg(OH)_2$ with 86.9% $Mg(OH)_2$ content was obtained on drying in a tray drier. A part of the $Mg(OH)_2$ was calcined at 850° C. yielding MgO of 90.0%. The 90 L of filtrate containing 22.3% $CaCl_2$ was used to desulphate 90 L of SEL obtained in Example-3. The resultant slurry was filtered to obtain 142 L of desulphated SEL and 21.0 kg of gypsum by-product, 57 L of desulphated SEL was mixed with 41 L of desulphated end bittern from Example-1 having Mg concentration of 10.3%. The resultant solution was subjected to forced evaporation in an open pan evaporator till the solution attained a boiling point of 120° C. The hot liquor was filtered to separate 5.5 kg of crude NaCl having composition: NaCl—85%, KCl—2.9% and $MgCl_2$—12.1%. The filtrate was cooled in a tank to crystallize carnallite. The resultant slurry was filtered to obtain 11.3 kg of carnallite analysing as KCl—21.7%, NaCl—9.7%, $MgCl_2$—31.4%, and $CaSO_4$—2.7% and 48 L of end bittern analyzing as $MgCl_2$—40.2%, KCl—0.8%, NaCl—1.1%. 9.2 kg of carnallite was decomposed using 3.6 of water and filtered to get 8.0 L of carnallite decomposed liquor (CDL) having chemical composition: KCl—1.6%, NaCl—2.8%; $MgCl_2$—30.5%; $CaSO_4$-traces, and 2.9 kg CDP having chemical composition: KCl—75.3%, NaCl—20.2%, $MgCl_2$—2.0% and $CaSO_4$—2.5%. The CDP was treated with 1.9 L of water at ambient temperature (30° C.) to obtain 2.0 kg KCl having composition: KCl—90.0%, NaCl—3.3%; $MgCl_2$—0.4% and $CaSO_4$—6.0 and 2.2 L of saturated solution having chemical composition KCl—14.0% and NaCl—20.0%.

EXAMPLE-7

Of 10 L of CDL obtained in above experiment, 5.7 L of cold leachate with which crude salt produced in the previous example was also washed to recover magnesium content in it, having chemical composition: KCl—7.0%, NaCl—8.2%, $MgCl_2$—21.5%, and $CaSO_4$—traces, and 15 L of water was treated with 2.5 Kg of freshly prepared hydrated lime having 90% activity for 1 hr. The resultant slurry was filtered and solid cake washed with 10 L of water to obtain 34 L of filtrate containing 7.7% $CaCl_2$. The solid magnesium hydroxide was further washed with 30 L of water to make it free from soluble impurities. The $Mg(OH)_2$ was dried to obtain 2.3 Kg of $Mg(OH)_2$ which was calcined to get MgO analyzing as 92% MgO containing 0.034% $B_2O_3$ as impurity. 34 L of $CaCl_2$ containing brine was used to desulphate 17 L of SEL having chemical composition KCl—7.2%, NaCl—12.4%, $MgSO_4$—16.0%, and $MgCl_2$—6.5%. The resultant slurry was filtered to remove 5.2 kg of wet calcium sulphate and obtain 49 L of desulphated SEL having Mg content of 2.03%. 75 L of end bittern having Mg concentration of 9.6% obtained from previous experiment was added to the desulphated SEL. The resultant solution mixture was subjected to forced evaporation in open pan evaporator till the boiling point of the solution is 126° C. The hot liquor was cooled in a tank to crystallize carnallite. The resultant slurry was filtered to obtain 18.8 kg of carnallite having chemical composition: KCl—14.3%, NaCl—12.7%, $MgCl_2$—31.9% and $CaSO_4$—1.9% and 46.5 L of end bittern having chemical composition. $MgCl_2$—46.1%, KCl—0.2%, NaCl—0.5%. 18.8 kg of carnallite was decomposed using 8 L of water and filtered to get 15.5 L of CDL having chemical composition; KCl—4.8%, NaCl3.2%, $MgCl_2$—32.5% and $CaSO_4$—traces; and 5.7 kg CDP having chemical composition: KCl—33.9% and NaCl—46.3%, $MgCl_2$—1.4%, $CaSO_4$—5.1% and Moisture-13%. The CDP was subjected to hot leaching along with CDP obtained in the following example by known method to separate KCl as detailed below.

EXAMPLE-8

15.5 L of CDL obtained in above experiment having chemical composition: KCl—5.0%, NaCl—3.2%, $MgCl_2$—32.5% and $CaSO_4$—traces; and 15 L of water was treated with 3.0 kg of freshly prepared hydrated lime having 90.0% activity for 1 hr. The resultant slurry was filtered and solids washed with 10 L of water to obtain 27.5 L of filtrate containing 10.60% $CaCl_2$. The solid magnesium hydroxide was further washed with 30 L of water to make it free from soluble impurities. The $Mg(OH)_2$ was dried to obtain 2.9 kg of $Mg(OH)_2$ and subsequently calcined to obtain caustic calcined MgO having 95% MgO content and 0.03% $B_2O_3$ impurity. The $CaCl_2$ containing solution was used to desulphate 25 L of SEL having chemical composition KCl—7.2%, NaCl~12.4%, $MgSO_4$ 16.0% and $MgCl_2$—6.5%. The resultant slurry was filtered to remove 5.7 kg of calcium sulphate and obtain 46 L of desulphated SEL having Mg content of 3.05%. 33 L of end bittern having Mg concentration of 11.8% obtained from previous experiment was added to the desulphated SEL. The resultant solution mixture was subjected to forced evaporation in an open pan evaporator till the boiling point of the solution is 125° C. The hot liquor was cooled in a tank to crystallize carnallite. The resultant slurry was filtered to obtain 14 kg of carnallite having chemical composition: KCl—15.0%, NaCl—24.7%, $MgCl_2$—25.1%, and $CaSO_4$—4.0% and 33.8 L of end bittern having chemical composition, $MgCl_2$—44.8%, KCl—0.1%, and NaCl—0.46%. 14.0 kg of carnallite was decomposed using 6.3 L of water and filtered to get 12 L of CDL having chemical composition, KCl—5.6%, NaCl 4.4%; $MgCl_2$—27.6% and $CaSO_4$-traces; and 5.0 kg of CDP having chemical composition: KCl—26.1% and NaCl—51.1%, $MgCl_2$—7.1%, $CaSO_4$—5.1% and moisture-9.0%. The CDP obtained along with CDP from Example-7 weighing 10.8 kg, was subjected to hot leaching by known method to obtain 3.5 kg of MOP having 93.6% KCl content.

EXAMPLE-9

In this example, MOP produced in the above Example-8 was used to prepare SOP. 9.0 kg of kainite type of mixed salt analyzing as KCl—14.2%, NaCl—16.5%, $MgSO_4$—40.2%, $MgCl_2$—1.2%, was reacted with 8 L of water for 2 hr. The slurry was centrifuged to get 3.0 kg of schoenite analyzing as $K_2SO_4$—35.5%, $MgSO_4$—31.0%, and NaCl—3.3%, and 9.5 L of filtrate (SEL) analysing as and KCl—7.6%, NaCl—12.6%, $MgSO_4$—15.1%, $MgCl_2$—9.5%, 0.488 kg of schoenite was further reacted with the solution of 0.190 kg MOP (from obtained in above Example-8) in 0.753 L of water for 3.5 hr to yield 0.255 kg SOP and 0.860 L of KEL. The SOP analysed as $K_2SO_4$—93.0%, NaCl—0.6%, $MgSO_4$—5.4% and KEL as KCl—14.8%, NaCl—1.4%, $MgSO_4$—7.7%, $MgCl_2$—4.1%.

We claim:

1. An integrated process for preparation of sulphate of potash (SOP) from bittern comprising:
   (i) subjecting bittern to fractional crystallization to obtain kainite mixed salt with high kainite content and $MgCl_2$-rich end bittern, and subjecting the MgCl2 rich end bittern to desulphation,
   (ii) treating the kainite mixed salt with water and mother liquor obtained in step (xiii) below to leach out substantially all NaCl from the mixed salt and simultaneously convert kainite into schoenite;
   (iii) filtering the schoenite and separating the filtrate hereinafter referred to as SEL;
   (iv) desulphating the SEL with aqueous $CaCl_2$ to produce gypsum;
   (v) filtering the gypsum produced in step (iv) and mixing the filtrate with $MgCl_2$-rich filtrate obtained in step (vii) below,
   (vi) evaporating the resultant solution of step (v), hereinafter referred to as desulphated SEL, and cooling to ambient temperature to crystallize crude carnallite,
   (vii) centrifuging the crude carnallite and recycling the $MgCl_2$-rich filtrate to step (v);
   (viii) decomposing the crude carnallite from step (vi) with an effective amount of water to yield cride KCl and carnallite decomposed liquor;
   (ix) filtering the crude KCl, and washing with water to remove adhering $MgCl_2$ and subjecting to hot leaching for production of muriate of potash (MOP) and NaCl;
   (x) mixing the carnallite decomposed liquor from step (viii) and washing from step (ix) and treating with hydrated lime to form a slurry;
   (xi) filtering the slurry and washing the resultant filter cake to produce $Mg(OH)_2$ and $CaCl_2$-containing filtrate for the desulphatation process of step (iv);
   (xii) treating the schoenite produced in step (iii) with MOP produced in step (ix) to produce SOP under ambient condition;
   (xiii) filtering the SOP and collecting separately the mother liquor hereinafter referred to as KEL;
   (xiv) recycling the KEL of step (xiii) in the process of step (ii).

2. The process as claimed in claim, 1, wherein the bittern of (i) contain effective amounts of K, Mg and $SO_4$ suitable for kainite production.

3. The process as claimed in claim 2 wherein said bittern is selected from the group consisting of sea bittern, subsoil bittern, and bittern with higher potassium content and which also requires the least evaporation to produce kainite mixed salt, and waste bittern sources including debrominated bittern effluent.

4. The process as claimed in claim 1 wherein said mixed salt contains KCl—15–22%, NaCl—15–22%, $MgSO_4$—28–40%, $MgCl_2$—5–10%.

5. The process as claimed in claim 1 wherein one part by weight of mixed salt is treated with 0.75–1.25 parts by volume of KEL and 0.3–0.7 pans by volume of water.

6. The process as claimed in claim 1 wherein said KEL contains 15–17% KCl, 1–3% NaCl, 10–12% $MgSO_4$, and 2–3% $MgCl_2$.

7. The process as claimed in claim 1 wherein the SEL contains 8–10% KCl, 6–12% NaCl, 12–14% $MgSO_4$ and 5–7% $MgCl_2$.

8. The process as claimed in claim 7 wherein 1 part by volume of desulphated SEL was mixed with 0.5–1.5 parts by volume of $MgCl_2$-rich end bittern of 36–38° Be' (s.g. 1.33–1.38).

9. The process as claimed in claim 8, wherein said desulphated SEL is mixed with 0.7–0.9 parts by volume of $MgCl_2$-rich end bittern of 37° Be' (sp. gr. 1,342).

10. The process as claimed in claim 8, wherein said desulphated SEL is mixed with $MgCl_2$-rich end bittern containing no sulphate.

11. The process as claimed in claim 1 wherein the schoenite contains 40–45% $K_2SO_4$, 30–35% $MgSO_4$ and 0.5–2.0% NaCl.

12. The process as claimed in claim 1 wherein the stoichiometric ratio of $CaCl_2$ to sulphate for the desulphatation reaction of step (iv) is 1.1:1 to 0.9:1.

13. The process as claimed in claim 12, wherein said stoichiometric ratio is 1:1.

14. The process as claimed in claim 1 wherein the evaporation of desulphated SEL to produce carnallite is carried out in a solar pan or in a multiple effect evaporator with simultaneous recovery of water.

15. The process as claimed in claim 1 wherein the evaporation of desulphated SEL is continued till the solution attains a temperature in the range of 120–128° C.

16. The process as claimed in claim 15 wherein said temperature is in the range of 122–1240° C.

17. The process as claimed in claim 1 wherein the carnallite obtained has 15–20% KCl, 15–20% NaCl and 28–32% $MgCl_2$.

18. The process as claimed in claim 1 wherein one part by weight of the carnallite is decomposed with 0.4–0.6 parts by volume of water, followed by washing of the cake with a small quantity of water.

19. The process as claimed in claim 1 wherein the molar ratio of hydrated lime to $MgCl_2$ for production of $Mg(OH)_2$ and $CaCl_2$ is in the range of 0.8–1.0.

20. The process as claimed in claim 19 wherein said molar ratio is 0.90.

21. The process as claimed in claim 1 wherein said $Mg(OH)_2$ obtained is calcined to produce MgO with 94–98% purity and with 0.02–0.04% $B_2O_3$.

22. The process as claimed in claim 1 wherein the $Mg(OH)_2$ is used without upgradation for neutralization of acidified de-brominated bittern where such bittern is used as potash source by contacting said bittern with said $Mg(OH)_2$.

23. The process as claimed in claim 1 wherein the MOP obtained upon hot leaching of crude KCl has a purity in the range of 92–98% and NaCl content of 1–5%.

24. The process as claimed in claim 23 wherein said MOP has a purity in the range of >95% KCl and NaCl content of <2% NaCl.

25. The process as claimed in claim 1 wherein the NaCl obtained on hot leaching of crude KCl contains >97% NaCl.

26. The process as claimed in claim 1 wherein one part by weight of schoenite is treated with 0.3–0.6 parts by weight of MOP and 1–2 parts by volume of water, in the ambient temperature range of 20–45 degree C.

27. The process as claimed in claim 26 wherein said schoenite is mixed with 0.4 parts by weight of MCP and 1.5 by volume of water.

28. The process as claimed in claim 1 wherein the SOP produced has $K_2O$ content in the range of 50–52% and chloride in the range of 0.5–2.0%.

* * * * *